US008130078B2

(12) United States Patent
Tassy et al.

(10) Patent No.: US 8,130,078 B2
(45) Date of Patent: Mar. 6, 2012

(54) RFID BADGE WITH AUTHENTICATION AND AUTO-DEACTIVATION FEATURES

(75) Inventors: Vincent Tassy, Cagnes sur Mer (FR); Rey-Robert Xavier, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 943 days.

(21) Appl. No.: 12/134,508

(22) Filed: Jun. 6, 2008

(65) Prior Publication Data

US 2009/0289762 A1 Nov. 26, 2009

(30) Foreign Application Priority Data

May 22, 2008 (EP) .................................... 08305191

(51) Int. Cl.
*G05B 19/00* (2006.01)

(52) U.S. Cl. .................................... 340/5.83; 340/572.1

(58) Field of Classification Search ........................ None
See application file for complete search history.

(56) References Cited

U.S. PATENT DOCUMENTS

| | | | | | |
|---|---|---|---|---|---|
| 4,616,113 | A | * | 10/1986 | Jank et al. | 200/61.13 |
| 5,345,220 | A | * | 9/1994 | Wachsman | 340/568.4 |
| 5,952,924 | A | * | 9/1999 | Evans et al. | 340/573.1 |
| H2120 | H | * | 7/2005 | Cudlitz | 235/382 |
| 7,204,425 | B2 | | 4/2007 | Mosher, Jr. et al. | |
| 2006/0267737 | A1 | * | 11/2006 | Colby | 340/10.51 |
| 2006/0289657 | A1 | * | 12/2006 | Rosenberg | 235/492 |
| 2007/0069010 | A1 | * | 3/2007 | Mestres et al. | 235/380 |
| 2007/0220272 | A1 | | 9/2007 | Campisi et al. | |
| 2008/0028230 | A1 | * | 1/2008 | Shatford | 713/186 |
| 2008/0105751 | A1 | * | 5/2008 | Landau | 235/492 |
| 2008/0258563 | A1 | * | 10/2008 | Hodges | 307/112 |
| 2009/0159663 | A1 | * | 6/2009 | Mullen et al. | 235/379 |
| 2010/0275259 | A1 | * | 10/2010 | Adams et al. | 726/19 |

FOREIGN PATENT DOCUMENTS

EP 1 865 470 A1 12/2007

* cited by examiner

*Primary Examiner* — Jennifer Mehmood
*Assistant Examiner* — Brian Wilson
(74) *Attorney, Agent, or Firm* — Cantor Colburn LLP; Douglas Lashmit

(57) ABSTRACT

A radio frequency identification (RFID) badge is provided and includes a card, an authentication data acquisition and/or input device configured to receive inputted data unique to a holder of the card from the holder, an RFID tag having external system access information stored thereon, a controller configured to conduct an identification algorithm, during which the inputted data is compared with stored data, to thereby confirm that the holder is authorized to do so and to activate the RFID tag for a predetermined time upon such confirmation, a clip, which is structurally connected to the card and at least configured to cause the controller to conduct the identification algorithm and to deactivate the RFID tag, and a battery.

1 Claim, 2 Drawing Sheets

RFID BADGE WITH AUTHENTICATION AND AUTO-DEACTIVATION FEATURES

PRIORITY INFORMATION

Figure 1:
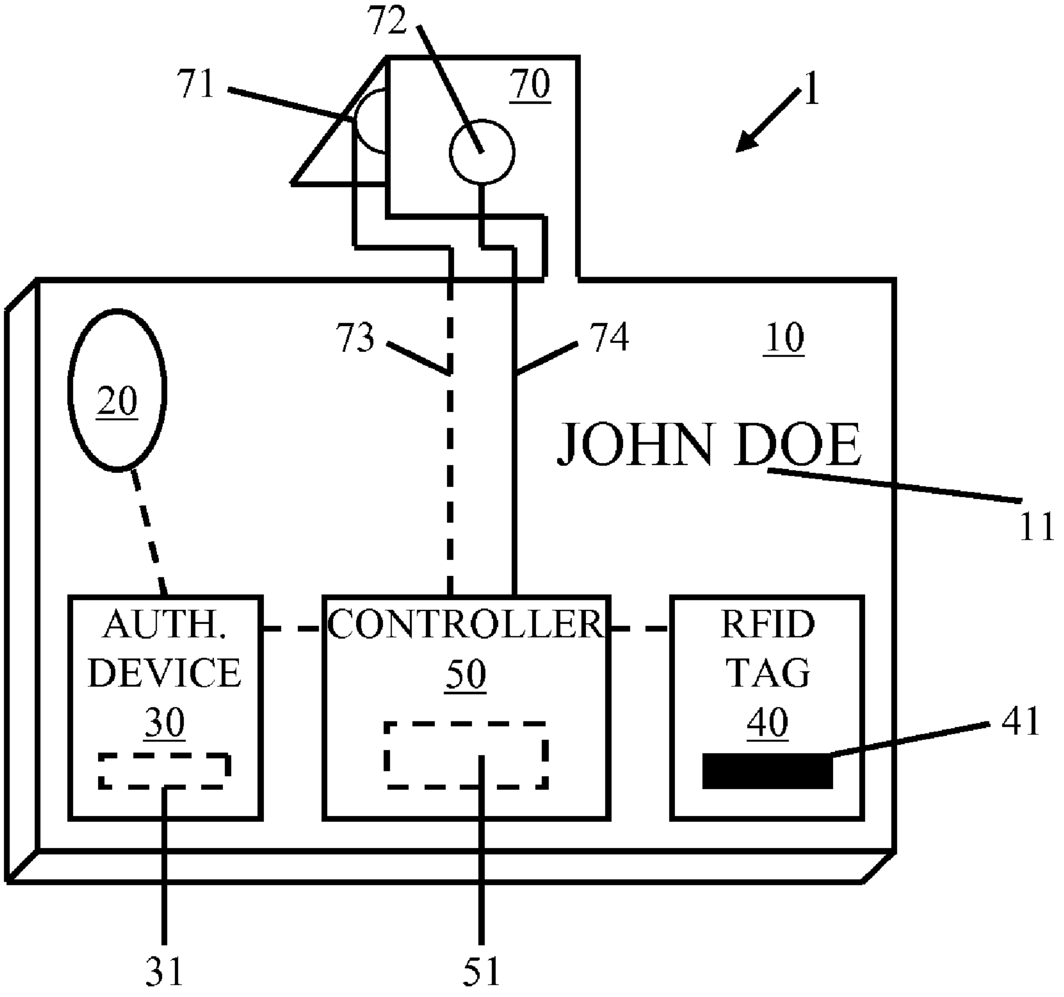

This application claims priority to European Patent Application No. EP 08305191.2, filed May 22, 2008.

BACKGROUND OF THE INVENTION

Aspects of the present invention are directed to an RFID badge and, more particularly, to an RFID badge with authentication and auto-deactivation features.

DESCRIPTION OF THE BACKGROUND

A radio frequency identification (RFID) badge is commonly used by an access control system to grant access to information or facilities to the holder of the RFID badge. In detail, the holder of the RFID badge is granted or denied access to the information or facilities in accordance with a predetermined access level associated with the RFID badge.

Security concerns with conventional access control systems and RFID badges remain, however, since the conventional access control systems are generally not equipped to confirm that the holder of the RFID badge is actually authorized to do so and since the conventional RFID badges do not themselves authenticate the identity of the RFID badge holders. As such, a stolen conventional RFID badge may grant the RFID badge thief unauthorized access to information or facilities.

The security concerns may be mitigated by the use of additional levels of security. For example, personal identification (PIN) numbers can be required to be typed into keyboards coupled to the access control systems when the RFID badges are used. Such PIN numbers indicate to the access control systems that the holders of the RFID badges are authorized to do so. In this way, the access control systems prevent RFID badge thieves from gaining unauthorized access since it is unlikely that the thieves would have knowledge of the required PIN numbers. Still, it has been seen that PIN numbers can be stolen or faked in the same manner as the RFID badges. Thus, their use does not guarantee system security. Moreover, RFID badges remain unable to independently verify the identity of the holder and, as such, cannot provide additional security by themselves.

SUMMARY OF THE INVENTION

In accordance with an aspect of the invention, a radio frequency identification (RFID) badge is provided and includes a card, an authentication data acquisition and/or input device configured to receive inputted data unique to a holder of the card, including at least one of fingerprint data and a combination of fingerprint data and alpha-numeric code data, from the holder, an RFID tag having external system access information stored thereon which is readable for access granting only when the RFID tag is activated and which is un-readable when the RFID tag is deactivated, a controller configured to conduct an identification algorithm, during which the inputted data is compared with stored data, to thereby confirm that the holder is authorized to do so and to activate the RFID tag for a predetermined time upon such confirmation or to otherwise deactivate the RFID tag, a clip, including electrically conductive leads connected to mating parts thereof and to the controller, which is structurally connected to the card and at least configured to cause the controller to conduct the identification algorithm only when the mating parts are initially disengaged from one another and to deactivate the RFID tag when the mating parts are engaged with one another, and a battery configured to provide power for the authentication data acquisition and/or input device, the RFID tag, the controller and the clip.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTIONS OF THE DRAWINGS

Figure 2:
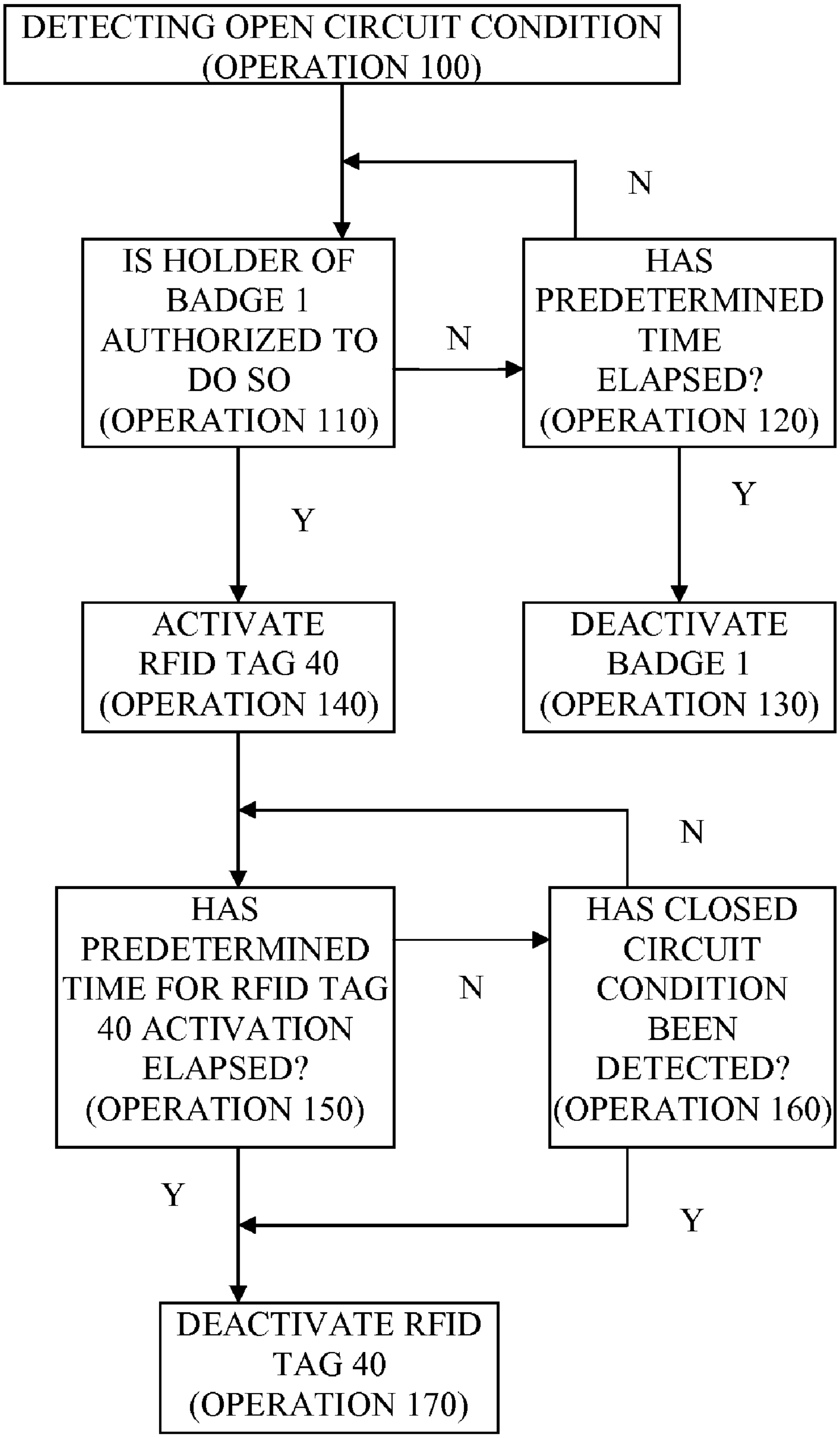

The subject matter regarded as the invention is particularly pointed out and distinctly claimed in the claims at the conclusion of the specification. The foregoing and other aspects, features, and advantages of the invention are apparent from the following detailed description taken in conjunction with the accompanying drawings in which:

FIG. 1 is a view of an RFID badge in accordance with an embodiment of the invention; and FIG. 2 is a flow diagram in accordance with an embodiment of the invention.

DETAILED DESCRIPTION OF THE INVENTION

With reference to FIG. 1, a radio frequency identification (RFID) badge 1 is provided and is equipped with authentication and deactivation features. These features allow the badge 1 to verify an identity of the holder of the badge 1 to thereby guard against the unauthorized use of the badge 1 by a holder who is not authorized to do so.

The badge 1 includes a card 10 having a battery 20 supported therein. The card 10 is three-dimensional and formed of a clear, partly, or completely opaque plastic that is commonly employed in the formation of identification cards and badges. A graphic identifier 11, such as a print out of the name of the authorized holder of the badge 1 and/or his picture, may be displayed on the plastic. The battery 20 may be supported entirely or only partly within the card 10 and may be a lithium-ion battery, and/or some other suitable power source, such as a photovoltaic cell.

The badge 1 further includes an authentication data acquisition and/or input device 30 (hereinafter referred to as "authentication device 30") that is electrically coupled to the battery 20. In this capacity, the authentication device 30 is configured with a data input unit 31 to receive inputted data from the current holder of the card 10. The inputted data may be any data serving an authentication purpose such as, but not limited to, a pin, an alphanumeric code, fingerprint data, hand palm data, retinal data, or any combination of authentication functions. Where the inputted data includes fingerprint data, the authentication device 30 is configured with a scanner that is capable of scanning the current holder's fingerprint to form a fingerprint image and a converter that is capable of converting the fingerprint image into the fingerprint data. Similarly, where the inputted data includes alphanumeric code data, the authentication device 30 is configured to include an alphanumeric keyboard by which the holder inputs the alphanumeric code data.

The ability of the authentication device 30 to receive fingerprint data allows for recognition of the inputted data that is unique to the holder of the badge 1 since any holder's fingerprint is unique. With that said, however, it is understood that even fingerprint data may be faked (e.g., by the use of a severed fingertip). Therefore, it is understood that the authentication device 30 could be alternately configured as any kind of an input device/biometric device to receive other types of unique data, such as retinal image data.

An RFID tag 40 is disposed on a surface of the card 10 or, if the card 10 is formed of a sufficiently clear plastic, within the card 10. The RFID tag 40 may include a bar code or a magnetic stripe 41 by which data, having access information stored therein, is represented. The RFID tag 40 is readable by an external device, such as a slotted access card reader, when the card 10 is swiped through the slot with the RFID tag 40 in a particular orientation. In this way, the holder of the badge 1 may be granted access in accordance with the access information. However, in accordance with embodiments of the invention, which will be discussed below, the access information can only be read by the external device when the RFID tag 40 is activated. Concurrently, the RFID tag 40 is unreadable by any device when the RFID tag is deactivated.

As an example, the badge 1 is provided to employees of Company X and has access information that allows the employees to enter and exit the company's plant. Each door of the company's plant is locked and unlocked by a door locking unit coupled to a card reader that causes a temporary unlocked state of the door when the card reader identifies the access information of the badge 1. Here, according to embodiments of the invention, the card reader could only identify the access information, however, if the RFID tag 40 were activated. As will be described below, such activation occurs only when the badge 1 confirms that the holder of the badge 1 is authorized to do so. In this way, if the badge 1 were to be stolen, the RFID tag 40 could not be activated and the thief would not be able to gain access to the plant.

A controller 50 is coupled to the authentication device 30 and includes a processor, such as an authentication chip 51, which is configured to conduct an identification algorithm. During the identification algorithm, the inputted data is compared with stored data. The stored data is stored in a memory of the controller 50 by an external system device that is authorized to do so by the badge 1 issuer and is unique to the authorized holder of the badge 1. If the inputted data matches the stored data, the controller 50 recognizes that the holder of the badge 1 is authorized to do so.

That is, with reference to the example above, Company X stores an image of an employee's fingerprint in the memory of the controller 50 and the controller 50 conducts the identification algorithm by comparing data of a holder's fingerprint, which is received via the authentication device 30, with data of the stored fingerprint image. If the data match, the identity of the holder is confirmed as being the authorized holder of the badge 1. If the data do not match, the holder of the badge 1 may be given a second or third chance to perfect his data within a predetermined length of time. If he is unable to perfect his data, the controller 50 may be configured to permanently disable the badge 1.

In addition to being coupled to the authentication device 30, the controller 50 is also coupled to the RFID tag 40. In this capacity, the controller 50 is configured to activate the RFID tag 40 for a predetermined time upon confirmation that the holder of the badge 1 is authorized to do so. Here, the predetermined time may be set by the badge 1 issuer and may last for a few seconds or an extended period of time. In detail, a lower limit for a length of the predetermined time may be set as a minimum time required for a card reader to identify the access information.

In additional embodiments of the invention, the controller 50 is also configured to deactivate the RFID tag 40 such that the access information of the RFID tag 40 is rendered unreadable. The controller 50 will deactivate the RFID tag 40 in accordance with the condition of a clip 70, as will be discussed below, and if the holder of the RFID tag 40 is unable to replicate the stored data because he is a thief and has a different fingerprint than the authorized holder or, where the stored data includes an alphanumeric code known only to the authorized holder, because he does not know the code and has entered an incorrect code three times.

The clip 70 is structurally connected to the badge 1 and has female and male mating parts 71 and 72 that can be employed to clip the badge 1 onto an item of the holder's clothing. In accordance with an embodiment of the invention, the clip 70 includes leads 73 and 74 that are coupled to the mating parts 71 and 72 and to the controller 50. The leads 73 and 74 may be formed of electrically conductive materials that form a closed circuit with the controller 50 when the mating parts 71 and 72 are engaged with one another. In this manner, a state of the engagement of the mating parts 71 and 72 is employed in the operation of the controller 50 and the RFID tag 40.

That is, by way of the connection between the mating parts 71 and 72 and the controller 50, the controller 50 is configured to detect an open circuit condition when the mating parts 71 and 72 of the clip 70 are disengaged with one another and a closed circuit condition when the mating parts 71 and 72 are engaged with one another. The controller 50 then operates the activation or the deactivation of the RFID tag 40 accordingly. For example, the controller 50 may be configured to conduct the identification algorithm when the open circuit condition is initially detected and to automatically deactivate the RFID tag 40 when the closed circuit condition is detected. Thus, whenever a holder of the badge 1 unclips the badge 1 from his clothing, he has a limited amount of time to authenticate his identity through the authentication device 30 and to gain desired access thereafter. Moreover, the RFID tag 40 of the badge 1 is deactivated whenever the badge 1 is clipped to the holder's clothing and will remain in this state until the badge 1 is unclipped and the holder's authorization is confirmed.

As shown in FIG. 1, the control of the RFID tag 40 is supported and accomplished by a direct connection, such as a circuit including a switch, between the controller 50 and the RFID tag 40. However, it is understood that other circuit options are available and within the scope of this invention. For example, the RFID tag 40 may be connected directly to the battery 20 along a circuit including a switch.

The programming of the controller 50 and the storing of the access information of the RFID tag 40 may be accomplished with the external badge making device operated by the badge 1 issuer. As is well known, the badge 1 could be reprogrammed or recycled by the badge making device if necessary in order to keep up with changing access conditions.

With reference to FIG. 2 and in accordance with another aspect of the invention, a method of operating a badge 1 includes detecting an open circuit condition of the clip 70 (operation 100) and then determining whether the holder of the badge is authorized to do so (operation 110). If the holder cannot be confirmed to be the authorized holder, it is determined whether the predetermined time for holder authorization confirmation is elapsed (operation 120) and, if so, the badge 1 is permanently deactivated (operation 130). If the holder is authorized to do so, the RFID tag 40 is activated and the access information is made accessible (operation 140). Then, it is determined whether the predetermined time for RFID tag 40 activation is elapsed (operation 150). If the predetermined time for RFID tag 40 activation is not elapsed, it is determined whether the closed circuit condition of the clip 70 is detected (operation 160). If the closed circuit condition is detected or if the predetermined time for the activation of the RFID tag 40 is elapsed, the RFID tag 40 is deactivated (operation 170).

In accordance with an aspect of the invention, the method described above may be embodied as a computer or machine readable medium having instructions stored thereon to execute the method.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof Therefore, it is intended that the disclosure not be limited to the particular exemplary embodiment disclosed as the best mode contemplated for carrying out this disclosure, but that the disclosure will include all embodiments falling within the scope of the appended claims.

We claim:

1. A radio frequency identification (RFID) badge comprising:

a card;

an authentication data acquisition and/or input device configured to receive inputted data unique to a holder of the card, including at least one of fingerprint data and a combination of fingerprint data and alphanumeric code data, from the holder;

an RFID tag having external system access information stored thereon which is readable for access granting only when the RFID tag is activated and which is un-readable when the RFID tag is deactivated;

a controller configured to conduct an identification algorithm, during which the inputted data is compared with stored data, to thereby confirm that the holder is authorized to do so and to activate the RFID tag for a predetermined time upon such confirmation or to otherwise deactivate the RFID tag;

a clip, including electrically conductive leads connected to mating parts thereof and to the controller, the mating parts being configured to clip to clothing of the holder, the clip being structurally connected to the card and at least configured to cause the controller to conduct the identification algorithm only when the mating parts are initially disengaged from one another and to deactivate the RFID tag when the mating parts are engaged with one another; and a battery configured to provide power for the authentication data acquisition and/or input device, the RFID tag, the controller and the clip.

* * * * *